United States Patent
May (10) Patent No.: US 6,491,220 B1
(45) Date of Patent: Dec. 10, 2002

(54) RESISTIVE PAGE COUNTING FOR PAPER TABLETS

(75) Inventor: Kim Wesley May, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 209 days.

(21) Appl. No.: 09/702,796

(22) Filed: Nov. 1, 2000

(51) Int. Cl.⁷ .................................................. G06K 7/00
(52) U.S. Cl. ...................................... 235/435; 235/441
(58) Field of Search ................................. 235/435, 441

(56) References Cited

U.S. PATENT DOCUMENTS

| | | |
|---|---|---|
| 3,719,261 A | 3/1973 | Heinzer et al. |
| 3,834,301 A | 9/1974 | Croquelois et al. |
| 3,995,729 A | 12/1976 | Anton et al. |
| 4,369,269 A | 1/1983 | Harper et al. |
| 4,636,881 A | 1/1987 | Brefka et al. |
| 5,569,868 A | 10/1996 | Leung |
| 5,764,221 A | 6/1998 | Willard |
| 5,829,904 A | 11/1998 | Matsumoto et al. |
| 6,388,765 B1 * | 5/2002 | Nagano et al. ............. 235/435 |

* cited by examiner

Primary Examiner—Harold I. Pitts
(74) Attorney, Agent, or Firm—Lacasse & Associates, LLC; Randy W. Lacasse; Marc D. McSwain (57) ABSTRACT

A writing pad for use with a computer includes a number of sheets each having a flexure sensor affixed thereto. Circuitry connected to the sensors determines whether the sheets are lifted and removed from the pad, whereby the particular sheet currently in use may be identified. The flexure sensor system can be used in various configurations such as: a one or multiple-part checkbook systems with recognition of check writing environment, as a children's book to add sound to identified pages, as an answer sheet for testing or voting, in a clipboard configuration or to assist a speaker during a slide-show presentation. The flexure sensors include resistive structures such as carbon based goo, transducers, conductive inks, strain gauges, patterned dissolved graphite, embossed sensors or other pressure/flexure sensors or equivalents thereof.

17 Claims, 13 Drawing Sheets

RESISTIVE PAGE COUNTING FOR PAPER TABLETS

BACKGROUND OF THE INVENTION

1. Field of Invention

The present invention relates generally to the field of electronic writing tablets. More specifically, the present invention is related to a writing pad with flexure sensors retained therein.

2. Discussion of Prior Art

When a computer is associated with written pages, a method for relating the pages to data in the computer is needed. Information such as where on a page, what number page, how many pages have been removed or turned is needed to correlate the physical pages to the data in the computer. At the present time, the prior art has failed to teach a system which accurately electronically identifies turned or removed pages from a writing tablet.

U.S. Pat. No. 4,636,881, to Brefka et al., describes a talking book with a left and right infrared detectors used to detect page turning. However, Brefka provide a limited means of detection—only detecting a left to right transfer of pages.

U.S. Pat. No. 5,569,868, to Leung, describes a sound generating book including a plurality of sensors, including transmitters and receivers, positioned at various places in the book. The sensors enable capacitive measurement and correlation with position thereof.

The available prior art described hereafter is limited to descriptions of pressure detection demarcations and use of conductive inks.

U.S. Pat. No. 5,764,221 to Willard (assigned to Willard Technologies) describes an electronic data collection system wherein a flexible data entry sheet covers a matrix of sensors. A user marks the sheet in a specified area and the detectors associate the mark position with a response to a question. Willard, however, fails to detect removed or turned pages and associate these actions with event driven actions. The article "The Paper Computer", http://www.papercomputer.com/PpC-folder/ppc-home.htm, describes an apparent product version of the above patent.

U.S. Pat. Nos. 3,719,261; 3,834,301; 3,995,729; 4,369,269, and 5,829,904 each describe the use of conductive inks in printing, but fail to include sensors or contacts included with pages to detect changes in resistance of the pages associated with turning or removal thereof.

Whatever the precise merits, features and advantages of the above cited references, none of them achieve or fulfills the purposes of the present invention. The present invention enables electronic detection of turned or removed pages from a writing tablet. These and other objects are achieved by the detailed description that follows.

SUMMARY OF THE INVENTION

A writing pad for use with a computer includes a number of sheets each having a flexure sensor affixed thereto. Circuitry connected to the sensors determines whether the sheets are lifted and removed from the pad, whereby the particular sheet currently in use may be identified. Alternative embodiments include using the elements of the invention in various configurations such as: a one or multiple-part checkbook systems with recognition of check writing environment, as a children's book to add sound to identified pages, as an answer sheet for testing or voting, in a clipboard configuration or to assist a speaker during a slide-show presentation. The flexure sensors include resistive structures such as carbon based goo, transducers, conductive inks, strain gauges, patterned dissolved graphite, embossed sensors or other pressure/flexure sensors or equivalents thereof.

DESCRIPTION OF THE PREFERRED EMBODIMENTS

While this invention is illustrated and described in a preferred embodiment, the device may be produced in many different configurations, forms and materials. There is depicted in the drawings, and will herein be described in detail, a preferred embodiment of the invention, with the understanding that the present disclosure is to be considered as a exemplification of the principles of the invention and the associated functional specifications of the materials for its construction and is not intended to limit the invention to the embodiment illustrated. Those skilled in the art will envision many other possible variations within the scope of the present invention.

Figure 1:
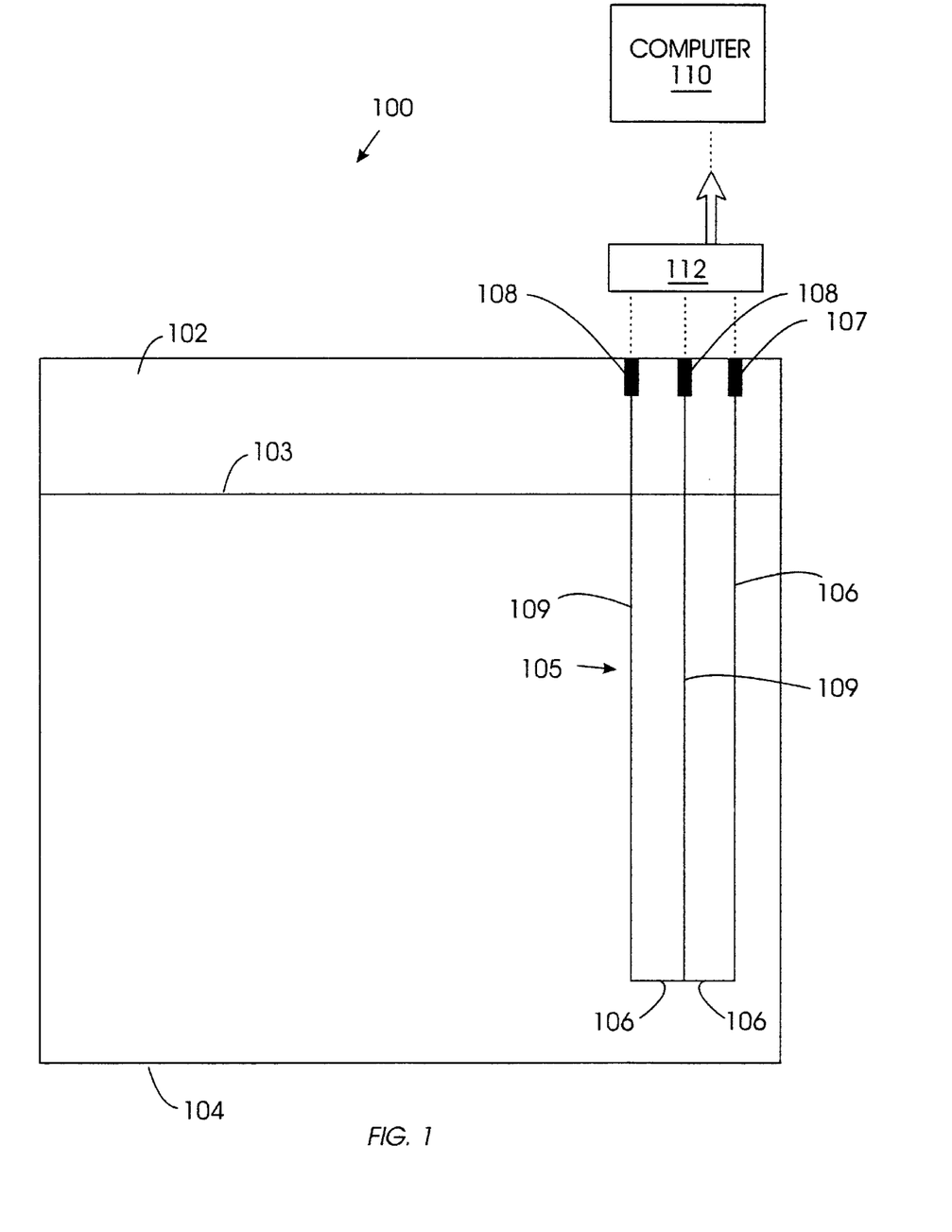
FIG. 1 illustrates a top view of a paper writing tablet incorporating the present invention.

FIG. 1 illustrates a paper writing tablet 100 incorporating the present invention. A writing pad includes fixed header section (binder) 102 and removable sheets 104 as separated by page perforation 103. Each page 104 includes one or more resistive bend sensors 105. The sensors are arranged typically on a back side of a sheet, but could be integrated within the page or placed on a front side without departing from the scope of the present invention. Each sensor includes a unique electrically resistive path section 109 and common connect section 106. The resistive bend sensors are comprised of flexible resistive structures such as, but not limited to, carbon based goo, transducers, conductive inks, strain gauges, patterned dissolved graphite or other pressure/flexure sensors or equivalents thereof. Connectors 107 and 108 complete the resistive path and transfer detected signals by known connectors or communication standards 112 (e.g., cables, patches, IR, RF, etc.) to external computer processing equipment 110 to interpret the output from the resistive sensor(s) 105.

In operation, as a user lifts pages, the bend sensors for each page signal software contained within the external computer equipment 110 that pages are lifted or removed and that a user is writing on another page. Software within computer 110 determines whether the sheets are lifted and removed from the pad by detecting changes in the resistance measurements of the embedded resistive sensors. In addition, the software can detect numerous pages that are bent. The system preferably has resistive bend sensors 105 affixed to the underside of each sheet 104, such that as sheet 104 is bent upward, the resistance of resistive bend sensor 105 increases. Alternatively, the system can have resistive bend sensors 105 affixed to the upper side of each sheet 104, such that as sheet 104 is bent upward, the resistance of resistive bend sensor 105 decreases. The resistive bend sensor may be embedded within sheet 104 also. Typically each sheet will be uniquely identified by a particular resistance value different for each sheet, however the invention is not limited to this method.

The system detects changes in resistance relative to the measured resistance value of a flat (unbent) page. The measured resistance value may differ from a nominal value due to age, temperature, humidity, or other factors, so a measured resistance value from the time the system is initialized for a given use session is preferred as a reference.

Note that only two sheets 104 per tablet 100 are shown in this application for clarity. Tablets 100 may generally include hundreds of sheets 104.

Figure 2A:
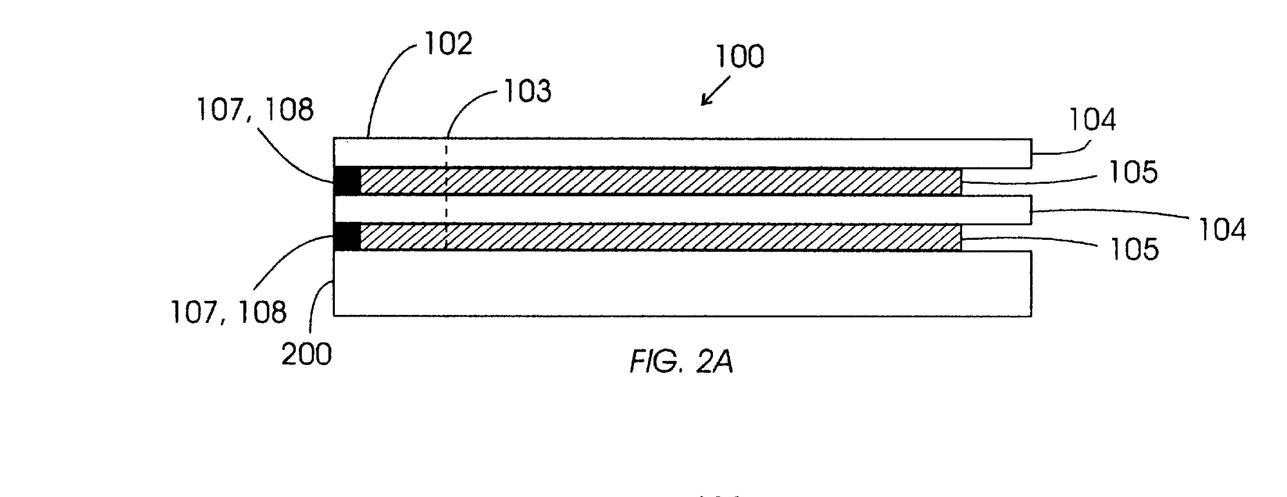
FIG. 2A illustrates a side view cut-away of the tablet shown in FIG. 1.

Referring now to FIG. 2A, a cut-away view of tablet 100 is shown (vertical scale exaggerated). The removable sheets 104 (and resistive bend sensors 105 affixed thereto) are bound together to form fixed header section 102, for example, by gluing the upper portions of sheets 104 together. Alternately, sheets 104 can be stapled together as long as the staples do not short any of the connectors 107, 108 together. Backing 200 provides mechanical support for sheets 104 and is attached to fixed header section 102 by conventional means. Backing 200 may have a conductive sheet (not shown) attached, preferably on its bottom side, to help shield resistive bend sensors 105 from external electrical interference.

Figure 2B:
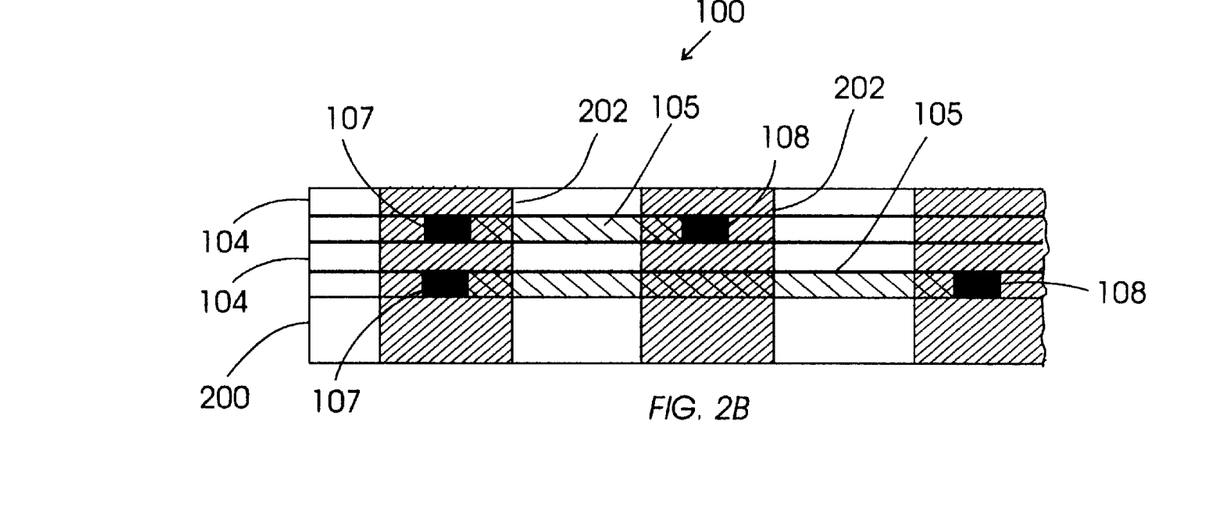
FIG. 2B illustrates a view of the top edge of the tablet shown in FIG. 1.

Referring now to FIG. 2B, a view of the top edge of tablet 100 is shown. Connectors 107 and 108 can be extended across the top edge of tablet 100 via printed stripes 202 of conductive ink. The conductive ink "bleeds" inward slightly via capillary action when wet and adheres to connectors 107, 108 to form an electrical connection when dry. Printed stripes 202 may extend further to the top portion of fixed header section 102, providing an array of electrical contacts accessible from above tablet 100. Alternately, foil tape may be used for the same purpose.

Figure 2C:
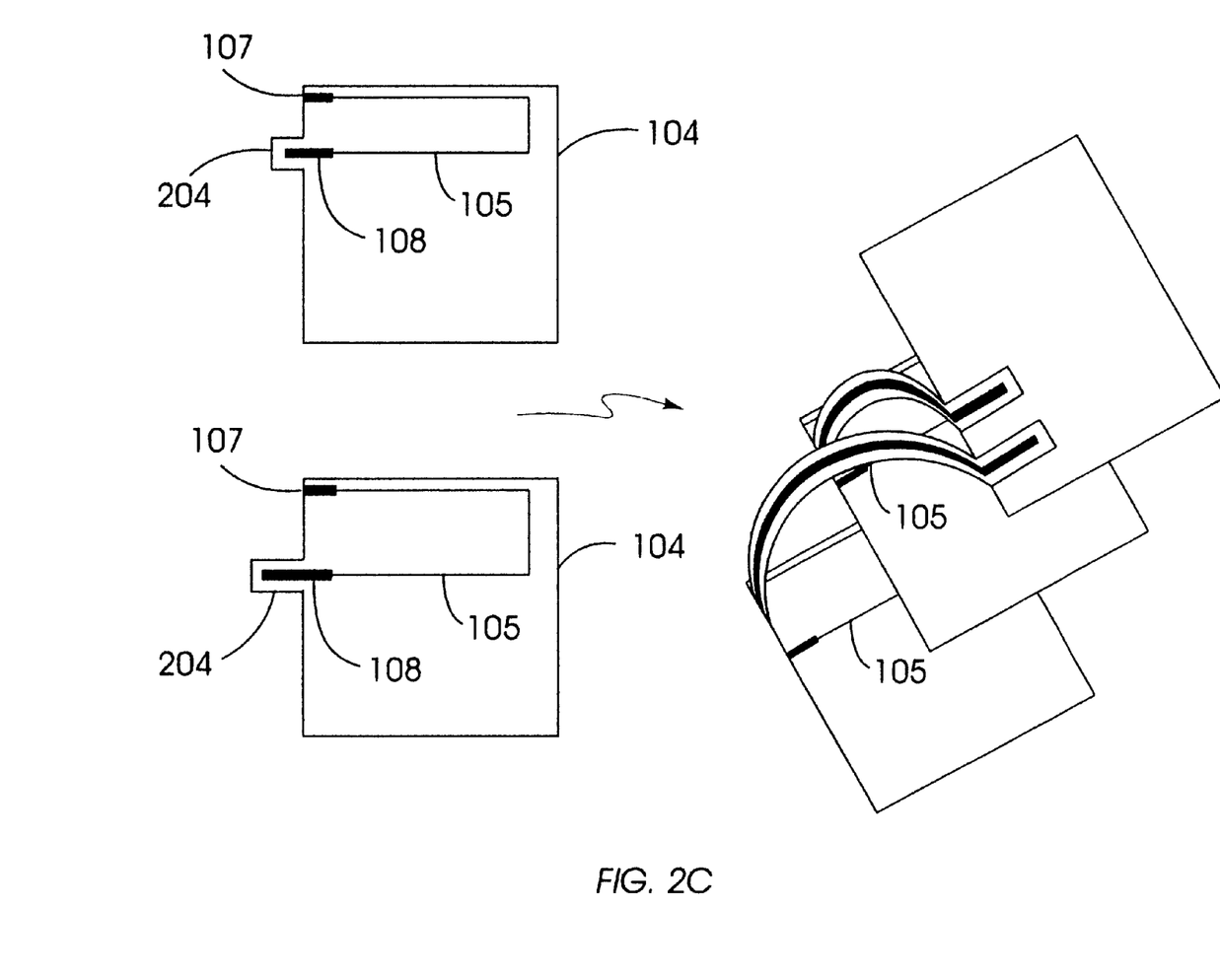
FIG. 2C illustrates a view of tab-connected sheets of the tablet shown in FIG. 1.

Referring now to FIG. 2C, a top view of two sheets 104 of tablet 100 is shown. In this alternate embodiment, each sheet includes tabs 204 of varying length, and sensors 105 are affixed to the underside of sheets 104. Tabs 204 for upper sheets 104 are shorter than tabs 204 for sheets 104 that are closer to backing 200. Tabs 204 for each sheet 104 are offset by different distances from the edge of each sheet 104. Connectors 108 extend onto tabs 204. When sheets 104 are assembled into tablet 100, tabs 204 are bent upward and glued to the upper portion of fixed header section 102, forming an array of electrical contacts spaced across fixed header section 102. In this embodiment, connector 107 is preferably formed using printed stripes 202 of conductive ink as described in FIG. 2B above, because tablets 100 having a large number of sheets 104 would have a very thick layer of connectors 107 if each sheet 104 had a second tab 204 for its own connector 107.

Rather than printing stripes 202 or using tabs 204, in the preferred embodiment an array of small holes (shown in FIG. 2D as a line of circular dots 117/118 on upper portion of fixed header section 102) are punched downward through each sheet 104 through all connectors 107 (117) and 108 (118). Conductive ink is then injected into the array of holes, forming conductive vertical columns adhering to each connector 107 and 108 and extending to the upper portion of fixed header section 102. The tops of the conductive columns thus form an array of electrical contacts spaced across fixed header section 102. Foil tape may then be placed on top of these electrical contacts for additional durability. Additionally, the bottoms of the conductive columns also form an array of electrical contacts spaced across the underside of fixed header section 102.

Figure 2D:
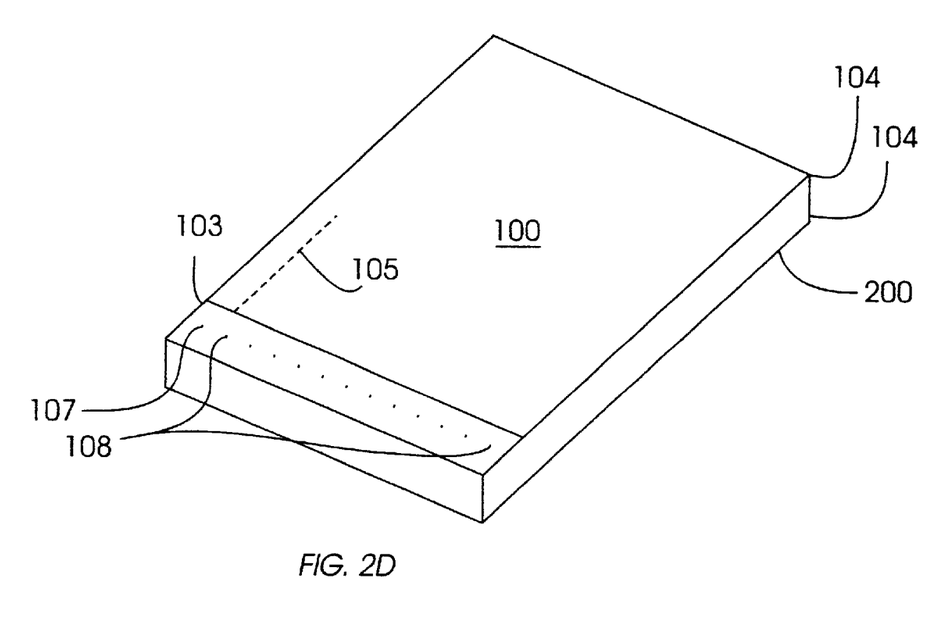
FIG. 2D illustrates an isometric view of the tablet shown in FIG. 1.

Referring now to FIG. 2D, an isometric view of tablet 100 is shown. Tablet 100 is available for conventional use without a computer system, but includes resistive bend sensors 105 and an array of contacts 117/118 for interfacing with a computer system.

Figure 3A:
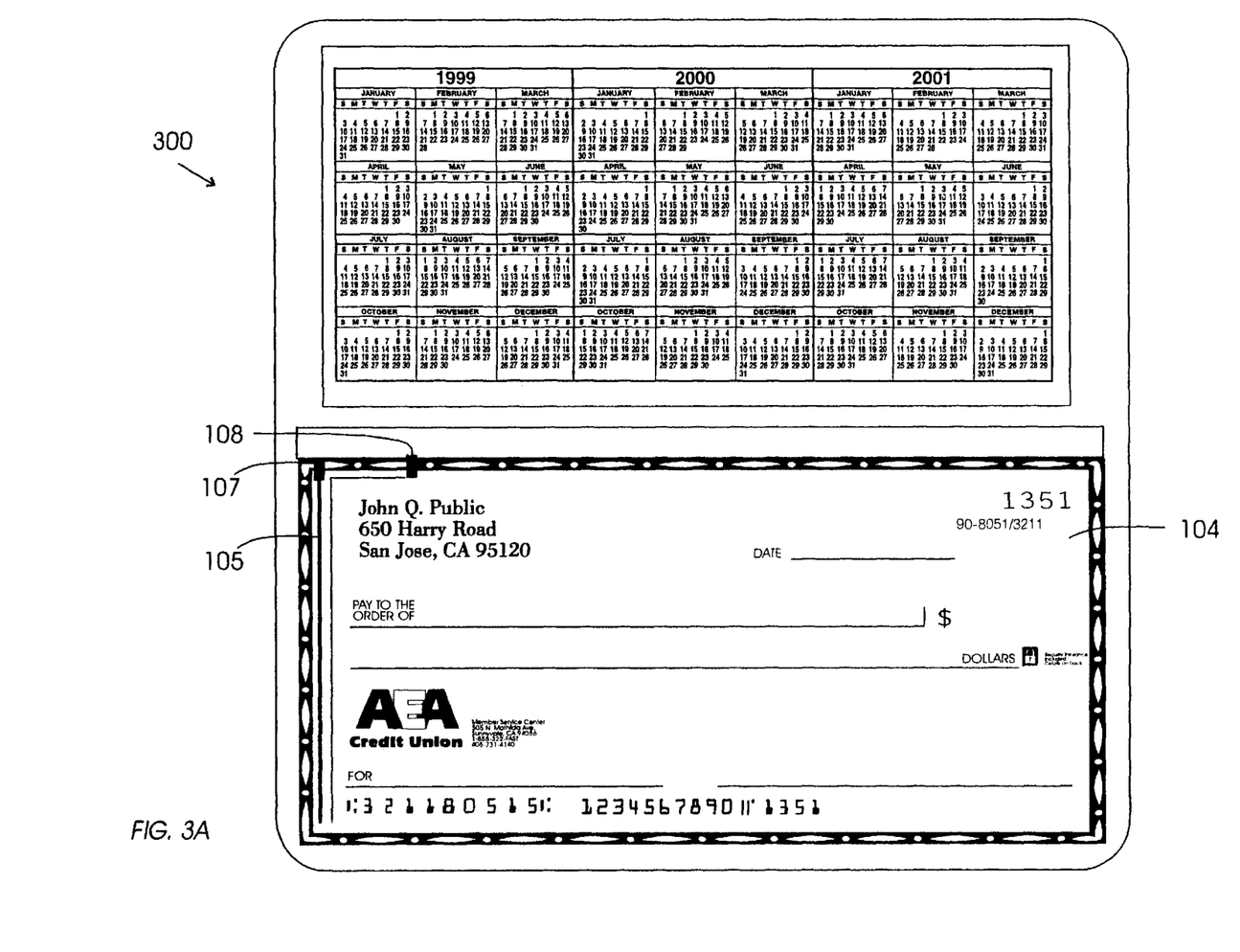
FIG. 3A illustrates a checkbook embodiment of the present invention.

FIG. 3A illustrates a checkbook embodiment 300 of the present invention. Each check is a sheet 104 having a resistive sensor 105 affixed thereto. Each sensor 105 is typically on the left underside edge away from check fields to be filled in by the user and also away from the MICR printed symbols at the lower portion of the check. A carbonless copy sheet, well known in the art, may also be present under each check in the checkbook. The present invention thus does not interfere with existing check features and check processing means.

Figure 3B:
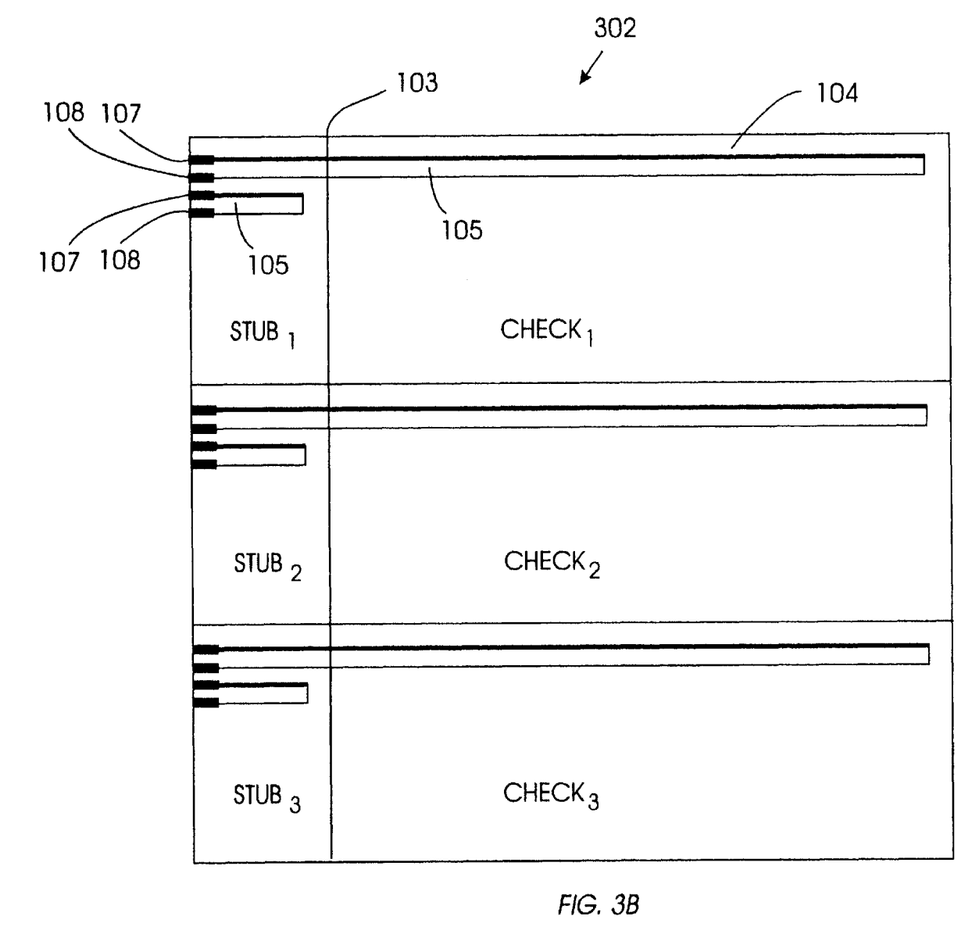
FIG. 3B illustrates a two-section checkbook embodiment of the present invention.

FIG. 3B illustrates a two-section checkbook embodiment 302 of the present invention. In this embodiment, each check and each check stub includes its own sensor 105. The date, time, and location at which a particular check is written may be recorded automatically by the system as a security feature and to provide verification of any such data manually written on the check stub.

Figure 4:
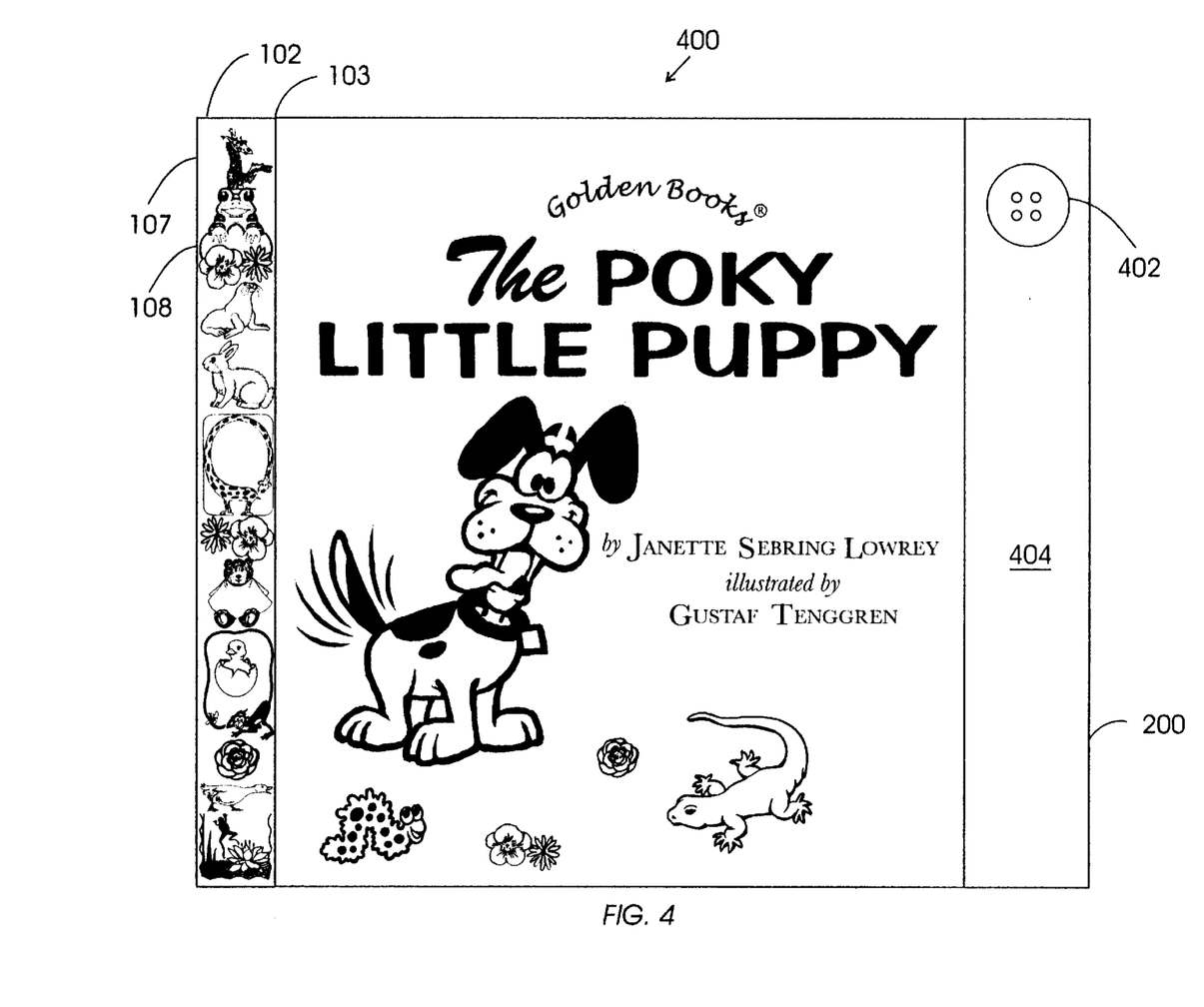
FIG. 4 illustrates a children's book embodiment of the present invention.
Figure 9:
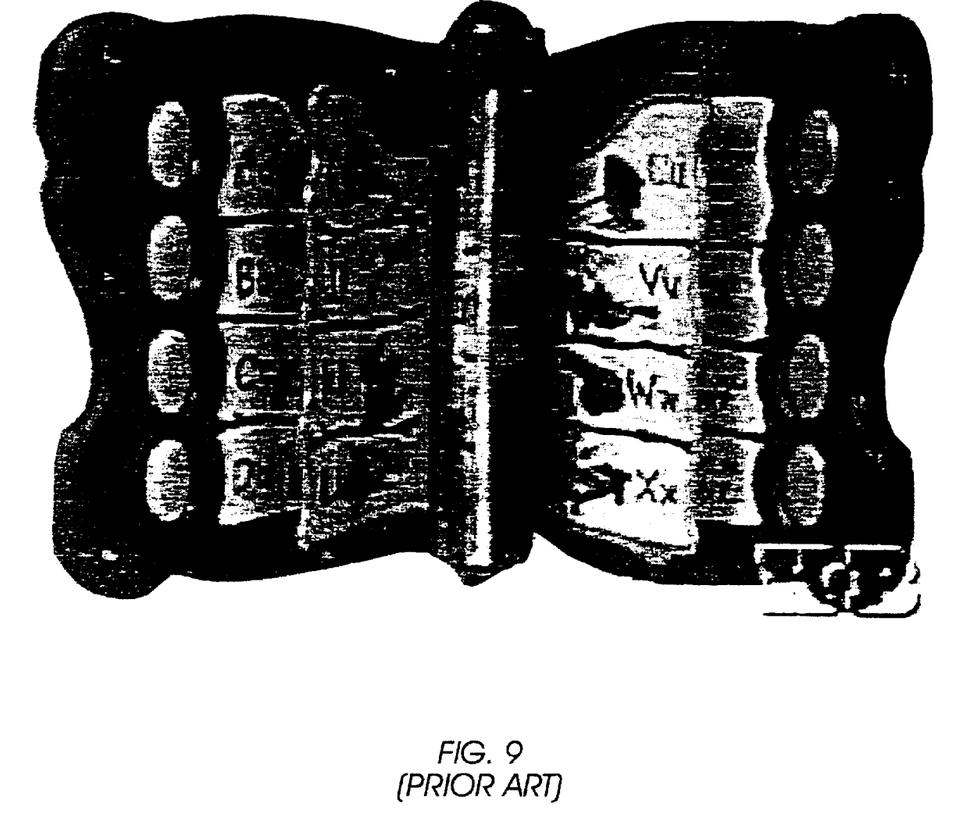
FIG. 9 illustrates a prior art sound generating book.
Figure 10:
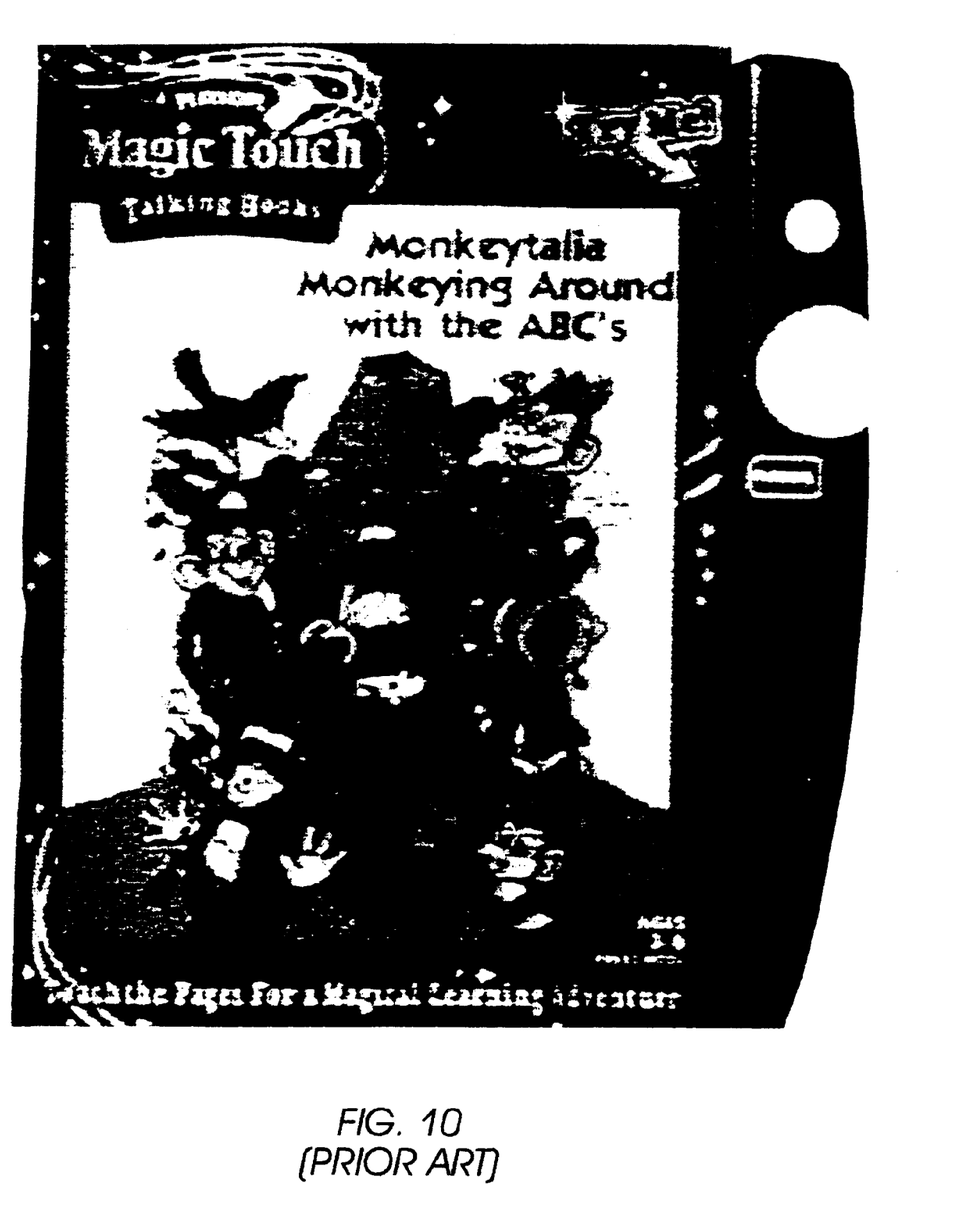
FIG. 10 illustrates a prior art sound generating book.

FIG. 4 illustrates a children's book embodiment 400 of the present invention. As a reader turns pages having flexure sensors 105, the system can responsively trigger generation of sound effects or verbal responses through speaker 105. Such interactive books are useful to increase the reader's participation in and enjoyment of reading. Such a book may also be of particular use to disabled persons, particularly the visually impaired. Books incorporating means for producing sound effects are known in the art (for example, the Playskool Magic Touch® products—FIG. 10, the LeapPad® Learning Center products, and the Mattel Talking Fun See 'n Say® products—FIG. 9), but automatic means for identifying a particular exposed page for such books using resistive flexure sensors is novel. Computer hardware/software functionality would typically be built-in using known methods such as ASIC technology in area 404; alternative methods are also deemed within the scope of the invention.

Figure 5:
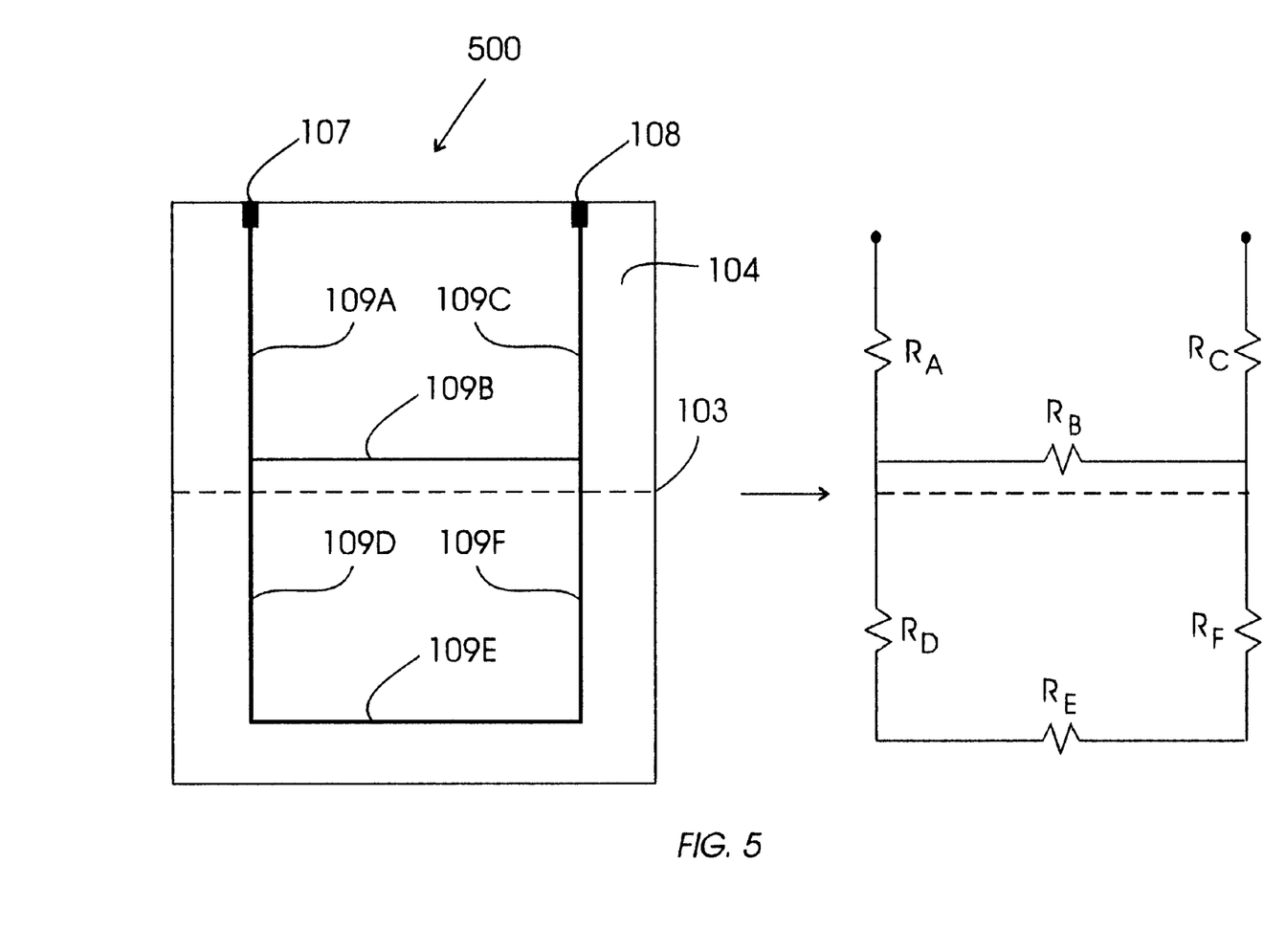
FIG. 5 illustrates a multiple resistor embodiment of the present invention.

FIG. 5 illustrates a multiple resistor embodiment 500 of the present invention. Resistive sensor path sections 109 are connected in various serial and parallel combinations on a single sheet 104. Sheet 104 can be perforated into sections 501 and 502, as in the case of the two-section checkbook described above, or as with a sheet of stamps or coupons. The resistance value of the remaining structure is altered even if sheet 104 is not bent, because the network topology of sensor path sections 109 changes as sections 501 or 502 are detached.

Conversely, a conductive path may be added to a sheet 104, changing the overall resistance of a printed pattern of resistive sensors 105. One means for adding a conductive path between contacts on a sheet 104 is to draw a conductive mark between the contacts with a writing instrument such as a graphite pencil. Such a system can be useful for automated voting systems and automated test scoring systems.

Figure 6:
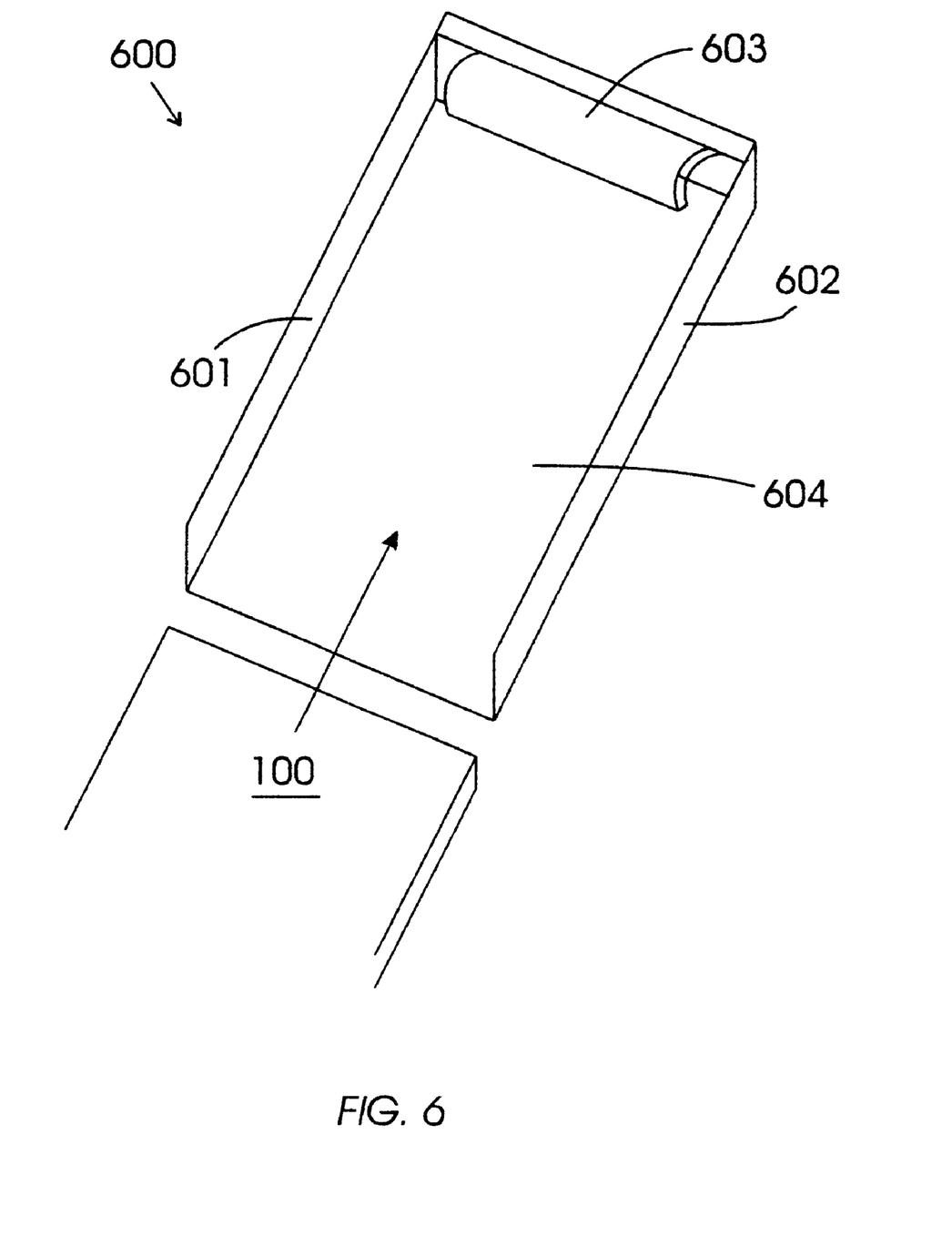
FIG. 6 illustrates a clipboard embodiment of the present invention.

FIG. 6 illustrates a clipboard embodiment 600 of the present invention. Writing tablet 100 fits between guide rails 601 and 602 attached to a backplate 604, and under clip 603. Clip 603 is preferably spring-loaded to retain tablet 100 within the clipboard. Clip 603 preferably includes an array of pins engaging the array of electrical contacts spaced across fixed header section 102 as described above. Additional pins below tablet 100 can engage electrical contacts on the underside of writing tablet 100; these underside electrical contacts may be redundant with the electrical contacts on the upper portion of fixed header section 102, or may be separate from the electrical contacts on the upper portion of fixed header section 102 to enable tablet 100 to include more sheets 104. Clip 603 also preferably includes circuitry to measure changes in the resistance values of sensors 105, identify pages that are missing or bent based on the resistance value changes, determine from that identification which page is currently exposed for use, and produce output signals based on such determination. Analog-to-digital convertors and digital logic circuitry used to implement the page counting and identification system of the present invention are inexpensive and known in the art. Clip 603 can also include a light (not shown) that may be switched on to illuminate tablet 100. Clipboard 600 may communicate its output signals to a computer system using known wireless techniques or a conventional ribbon cable.

Figure 7:
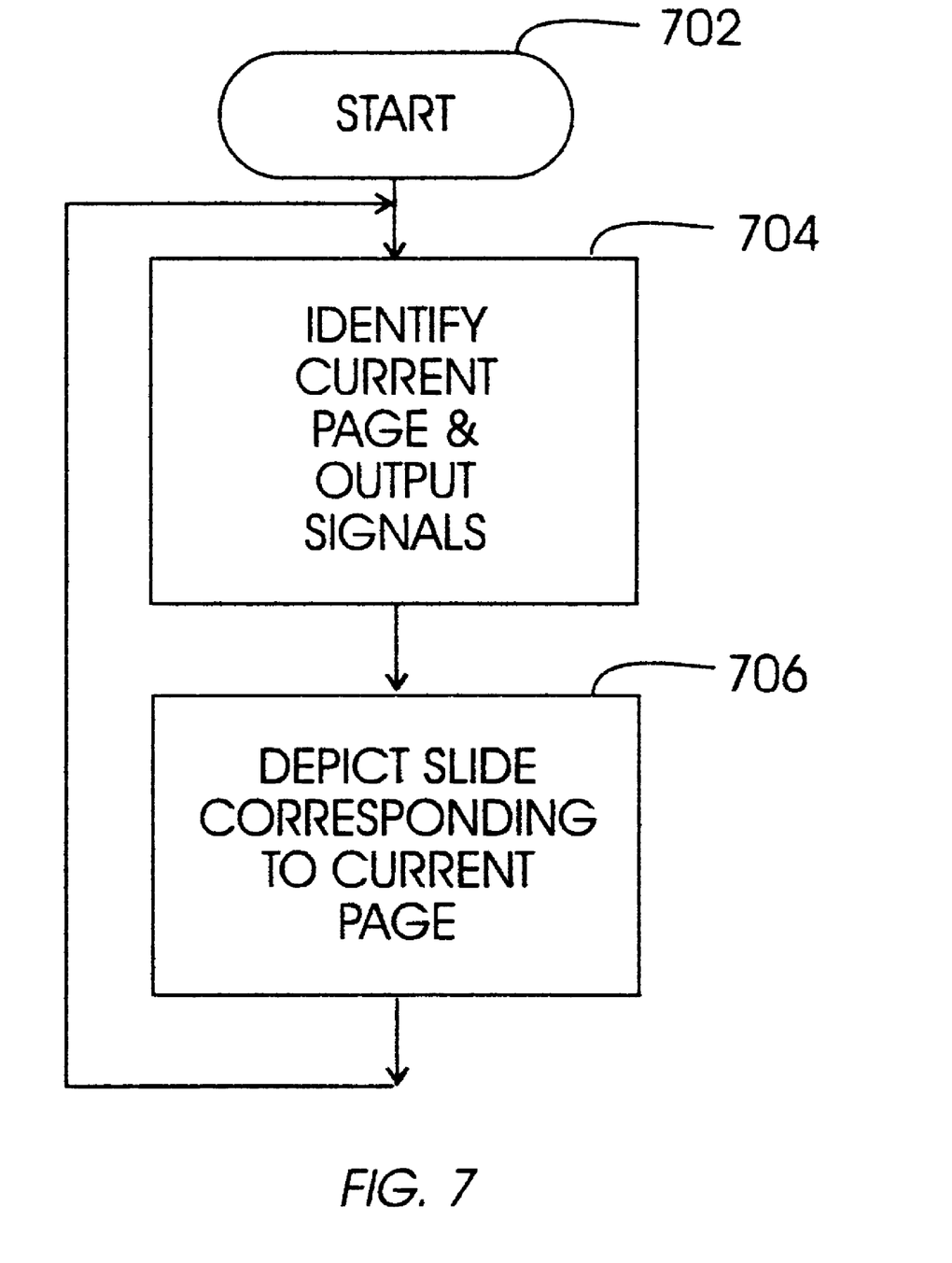
FIG. 7 illustrates a flowchart of a speaker presentation embodiment of the present invention.

FIG. 7 illustrates a flowchart of a speaker presentation embodiment 700 of the present invention. A speaker giving a presentation holds clipboard 600 including a tablet 100 with sheets 104 having notes or copies of slides to be presented. A computer system running a presentation software application, such as Freelance Graphics® by Lotus Development Corporation® is equipped to receive output signals from clipboard 600 as described above.

The presentation software application is initialized in step 702. Next, in step 704, the present invention identifies the particular sheet 104 exposed for use and produces appropriate output signals as described above. Then, in step 706, the presentation software responsively depicts a slide corresponding to the particular sheet 104 identified by clipboard 600. There may be a one-to-one correspondence between a sheet 104 and a particular slide depicted by the presentation software application. Alternately, there may be several sheets 104 corresponding to a single slide, e.g. one sheet 104 may be a copy of the slide, but other sheets 104 may contain detailed data or notes or comments for the speaker's own use in answering questions from the audience that would overly clutter the slide presented. The system continuously monitors output signals from clipboard 600 and coordinates the slides presented to the audience with sheets 104 being accessed by the speaker. The speaker may therefore simply flip sheets 104 back and forth in an arbitrary manner, and the presentation software application will automatically responsively depict a corresponding slide. Additionally, the presentation software may suppress presentation of a given slide if there are no sheets 104 in tablet 100 associated with the slide. This may occur if the speaker has chosen not to include a given slide in a presentation, and has thus removed associated sheets 104 from tablet 100 to edit the presentation without actually deleting the slide from the presentation software.

Figure 8:
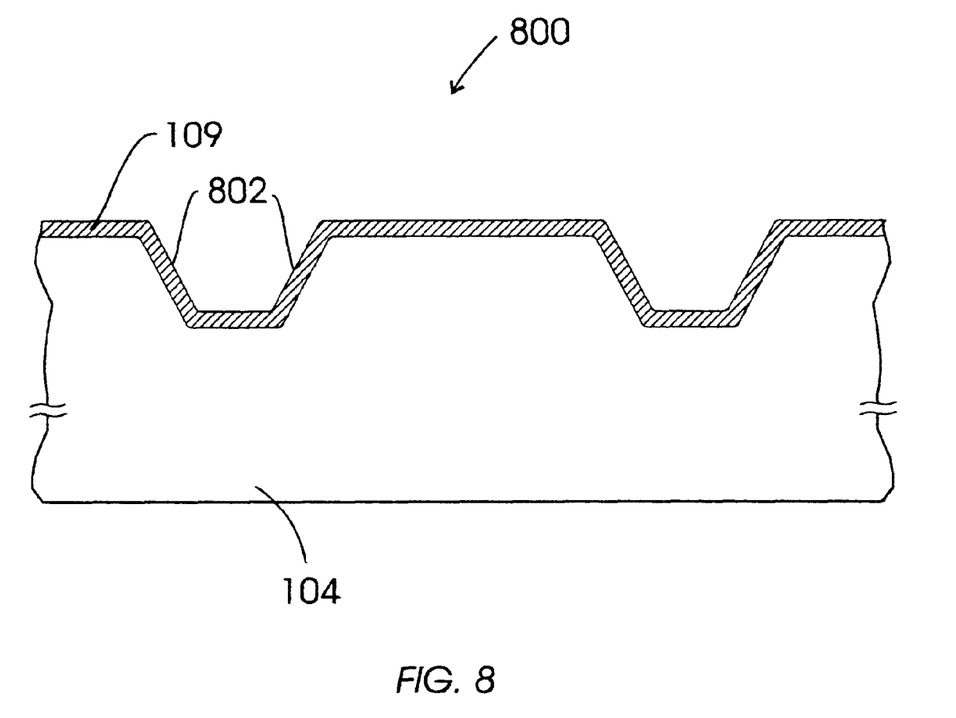
FIG. 8 illustrates a cut-away view of an embossed sensor of the present invention.

FIG. 8 illustrates a cut-away view of an embossed resistive flexure sensor 800 of the present invention. Experimentation has led to the discovery that if resistive path sections 109 are embossed by rolling an embossing wheel over sheets 104, for example, unexpected benefits may be had for virtually no additional cost. Compaction of the material comprising resistive path sections 109 increases the nominal unbent resistive value of the resistive path sections 109. Further, embossing resistive path sections 109 produces sidewall portions 802 that are thinner and not completely parallel to the surface of sheet 104. Sidewall portions 802 undergo more significant geometrical changes as sheet 104 is flexed, thus the change in resistance value of embossed sensors 800 is larger during flexure than is the case with non-embossed sensors 105.

The above resistive page counting preferred embodiment, alternative embodiments and its described functional elements are implemented in various computing environments. For example, the present invention hardware/software may be implemented on a conventional IBM PC or equivalent, ASIC, traditional IC logic circuitry, multi-nodal system (e.g. LAN) or networking system (e.g. Internet, WWW). All data related thereto is stored in computer memory, static or dynamic, and may be retrieved by the user in any of: conventional computer storage, display (i.e. CRT) and/or hardcopy (i.e. printed) formats. The programming of the present invention may be implemented by one of skill in the art of computer programming.

CONCLUSION

A system and method has been shown in the above embodiments for the effective implementation of a resistive page counting system for paper tablets. While various preferred embodiments have been shown and described, it will be understood that there is no intent to limit the invention by such disclosure, but rather, it is intended to cover all modifications and alternate constructions falling within the spirit and scope of the invention, as defined in the appended claims. For example, the present invention should not be limited by software/program, computing environment, specific computing hardware and resistive sensor materials including—placement, size or pattern.

What is claimed is:

1. A page counting and identification system comprising:
    a bound tablet structure comprising:
        one or more pages, each of said one or more pages including one or more resistive sensors;
        a binding structure retaining said one or more pages and comprising one or more electrical contacts on an outer surface, said contacts operatively connecting said one or more resistive sensors to computer processing equipment, and
    wherein said resistive sensors produce signals at said contacts when their corresponding pages are lifted upward thereby enabling identification and counting of said pages by said computer processing equipment.

2. A page counting and identification system, as per claim 1, wherein said one or more pages include at least two sections, each of said sections including at least one resistive sensor.

3. A page counting and identification system, as per claim 1, wherein said bound tablet structure comprises a checkbook.

4. A page counting and identification system, as per claim 2, wherein said at least two sections, comprise a two-section check with sensors in both sections.

5. A page counting and identification system, as per claim 3, wherein said external computer processing equipment identifies when a check is removed including any of: date, time and location.

6. A page counting and identification system, as per claim 1, wherein said sensors comprise any of: carbon based compositions, transducers, conductive inks, strain gauges, patterned dissolved graphite, embossed, pressure or flexure elements.

7. A page counting and identification system, as per claim 1, wherein said resistive sensors are any of: embossed, embedded within, placed on a back side, or placed on a front side of said one or more pages.

8. A page counting and identification system, as per claim 1, wherein said one or more pages comprise pages from a book and said system further comprises event driven audio or verbal responses initiated upon turning said one or more pages.

9. A page counting and identification system, as per claim 1, wherein said resistive sensors comprise differing resistive values for each page or sensor.

10. A page counting and identification system, as per claim 1, wherein said resistive sensors comprise multiple operatively connected sections such that when one section is removed a change in resistance is detected.

11. A page counting and identification system, as per claim 1, wherein said resistive sensors comprise multiple operatively connected sections connected by addition of a conductive path.

12. A page counting and identification system, as per claim 1, wherein said addition of a conductive path includes receiving a conductive writing instrument demarcation.

13. A method of identifying a page in a bound tablet of pages, each of said pages including a resistive sensor and an operative connection to a computing device, said method comprising:

measuring the resistance of said pages using said resistive sensors; identifying, using said computing device, pages based on said measured resistance, and determining from resistance changes identified pages removed or exposed for use.

14. A computer product comprising computer programmable code, said code identifying a page in a bound tablet of pages, each of said pages including a resistive sensor and an external connection to a computing device, said code executable within said computing device and comprising the steps of:

receiving signals indicating a resistance of said pages;

identifying specific pages based on said resistance, and producing event driven outputs based on a detection of a change in the resistance of specified pages.

15. A computer product comprising computer programmable code, said code identifying a page in a bound tablet of pages, as per claim 14, wherein said specified pages are associated with a visual presentation and said event driven outputs comprise changing images of said visual presentation based on a detected turned page.

16. A page counting and identification system for a bound writing pad comprising one or more pages, said system comprising:

a clipboard having guide rails to properly position said one or more pages thereon;

flexible resistive sensors associated with each of said pages;

an array of contacts located within a clipboard clip that operatively connect to said flexible resistive sensors at a top surface of said pages;

a detector and computer processor for identifying specific pages based on a resistance measurement from said flexible resistive sensors, and wherein changes in resistance measurements identify bent or removed pages.

17. A page counting and identification system for a bound writing pad comprising one or more pages, as per claim 16, wherein said resistive flexible sensors comprise embossed resistive flexure sensors having an increased nominal resistance value and including sidewall portions that increase the change in sensor resistance value per degree of flexure.

* * * * *